(12) United States Patent
Car et al.

(10) Patent No.: US 10,918,987 B2
(45) Date of Patent: Feb. 16, 2021

(54) PARTICULATE FILTER FOR AN INTERNAL COMBUSTION ENGINE AND METHOD FOR PRODUCING SUCH A PARTICULATE FILTER

(71) Applicant: Volkswagen Aktiengesellschaft, Wolfsburg (DE)

(72) Inventors: Onur Ulas Car, Berlin (DE); Markus Paulovsky, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/282,923

(22) Filed: Feb. 22, 2019

(65) Prior Publication Data

US 2019/0262757 A1    Aug. 29, 2019

(30) Foreign Application Priority Data

Feb. 23, 2018   (DE) .......................... 10 2018 104 140

(51) Int. Cl.
*B01D 46/24*     (2006.01)
*B01D 53/94*     (2006.01)
(Continued)

(52) U.S. Cl.
CPC ....... *B01D 46/244* (2013.01); *B01D 46/2422* (2013.01); *B01D 53/9418* (2013.01);
(Continued)

(58) Field of Classification Search
CPC .......... F01N 3/021; F01N 3/101; F01N 3/281; F01N 3/0222; B01D 46/244
(Continued)

(56) References Cited

U.S. PATENT DOCUMENTS

| 4,411,856 A | 10/1983 | Montierth |
| 4,557,773 A | 12/1985 | Bonzo |

(Continued)

FOREIGN PATENT DOCUMENTS

| CN | 104145094 A | 11/2014 |
| CN | 104755149 A | 7/2015 |

(Continued)

OTHER PUBLICATIONS

Extended search report for European Patent Application No. 19158276.6, dated Jul. 23, 2019.

(Continued)

*Primary Examiner* — Tom P Duong
(74) *Attorney, Agent, or Firm* — Pearl Cohen Zedek Latzer Baratz LLP

(57) ABSTRACT

A particulate filter for exhaust-gas aftertreatment in an internal combustion engine has a housing on which an inlet and an outlet are configured on opposite ends. The particulate filter also has a filter element arranged in the housing, said filter element having essentially parallel filter channels that are each alternatingly closed on the inlet side or on the outlet side by a closure in order to prevent gas from passing directly through the filter element. In this context, the filter channels can be divided into a first group of filter channels which are closed on the outlet side by a closure, and into a second group of filter channels which are closed on the inlet side by a gas-tight closure. The filter channels of the second group are additionally closed on the outlet side by a high-porosity closure in order to improve the cleaning effect of the particulate filter.

3 Claims, 2 Drawing Sheets

(51) Int. Cl.

| | |
|---|---|
| *B01J 35/04* | (2006.01) |
| *F01N 3/022* | (2006.01) |
| *F01N 3/035* | (2006.01) |
| *F01N 3/10* | (2006.01) |
| *F01N 3/20* | (2006.01) |
| *F01N 3/28* | (2006.01) |
| *F01N 3/021* | (2006.01) |

(52) U.S. Cl.
CPC .......... *B01D 53/9445* (2013.01); *B01J 35/04* (2013.01); *F01N 3/021* (2013.01); *F01N 3/0222* (2013.01); *F01N 3/035* (2013.01); *F01N 3/101* (2013.01); *F01N 3/2066* (2013.01); *F01N 3/281* (2013.01); *B01D 2046/2433* (2013.01); *B01D 2255/9155* (2013.01); *B01D 2279/30* (2013.01); *F01N 2510/06* (2013.01); *F01N 2610/02* (2013.01)

(58) Field of Classification Search
USPC ......................................... 422/168, 177, 180
See application file for complete search history.

(56) References Cited

U.S. PATENT DOCUMENTS

| | | |
|---|---|---|
| 2005/0138908 A1 | 6/2005 | Kasai et al. |
| 2005/0153099 A1 | 7/2005 | Yamada |
| 2005/0210848 A1 | 9/2005 | Kuki et al. |
| 2006/0191248 A1* | 8/2006 | Bardhan ............ B01D 39/2093 55/523 |
| 2008/0120968 A1 | 5/2008 | Beall et al. |
| 2009/0047188 A1 | 2/2009 | Miyairi et al. |
| 2014/0373515 A1 | 12/2014 | Seiler |
| 2015/0240678 A1 | 8/2015 | Aoyama et al. |
| 2018/0028957 A1 | 2/2018 | Knackstedt |

FOREIGN PATENT DOCUMENTS

| | | |
|---|---|---|
| CN | 107664052 A | 2/2018 |
| DE | 603 17 056 T2 | 7/2008 |
| DE | 10 2010 055 147 A1 | 6/2012 |
| EP | 0270990 A1 | 6/1988 |
| EP | 1 251 247 A1 | 10/2002 |
| EP | 1 312 776 A2 | 5/2003 |
| EP | 1 541 215 A1 | 6/2005 |
| EP | 1 580 181 A2 | 9/2005 |
| EP | 1 974 791 A1 | 10/2008 |
| EP | 1 997 556 A1 | 12/2008 |
| EP | 2 065 576 A1 | 6/2009 |
| EP | 2 087 215 B1 | 8/2012 |
| EP | 2 910 291 A2 | 8/2015 |

OTHER PUBLICATIONS

Search report for German Patent Application No. 10 2018 104 140.3, dated Oct. 31, 2018.
Office Action for Chinese Patent Application No. 2019101333847, dated Sep. 16, 2020.

* cited by examiner

PARTICULATE FILTER FOR AN INTERNAL COMBUSTION ENGINE AND METHOD FOR PRODUCING SUCH A PARTICULATE FILTER

CROSS REFERENCE TO RELATED APPLICATION

This application claims priority from German Patent Application No. 10 2018 104 140.3, filed Feb. 23, 2018, which is incorporated herein by reference in its entirety.

FIELD OF THE INVENTION

The invention relates to a particulate filter for installation in an exhaust gas system of an internal combustion engine, especially an externally ignited internal combustion engine operating according to the Otto principle, as well as to a method for producing such a particulate filter.

BACKGROUND OF THE INVENTION

Since legislation on exhaust-gas emissions is becoming increasingly stringent, the automotive industry is faced with high requirements, which are being met by appropriate measures aimed at reducing the raw emissions of engines and by an appropriate aftertreatment of the exhaust gas. The introduction of European emission standard Euro 6 for gasoline engines stipulates a limit value for the number of particles which, in many cases, requires the use of a gasoline particulate filter. Such soot particles are formed especially after a cold start of the internal combustion engine due to an incomplete evaporation of the fuel droplets, also in combination with a sub-stoichiometric air-fuel ratio following the cold start, due to cold cylinder walls and due to the heterogeneous mixture distribution in the combustion chambers of the internal combustion engine. Therefore, the cold start phase is decisive when it comes to complying with the statutorily stipulated limit value for particulate matter, both with respect to the weight of the particles and in terms of the number of particles.

Moreover, a cold start with a sub-stoichiometric, rich air-fuel ratio gives rise to higher emissions of carbon monoxide (CO) and unburned hydrocarbons (HC) since a conversion into carbon dioxide ($CO_2$) and water vapor is not yet possible because the catalytic converter is still cold. During operation of motor vehicles having a gasoline particulate filter, the latter is then additionally laden with soot. The gasoline particulate filter has to be regenerated continuously or periodically so as to prevent the exhaust-gas counter-pressure from rising excessively. A rise in the exhaust-gas counter-pressure can lead to increased fuel consumption by the internal combustion engine, to power loss, and to a deterioration of the running smoothness all to way to engine misfiring. In order to use oxygen to carry out a thermal oxidation of the soot that has been captured in the gasoline particulate filter, it is necessary to have a sufficiently high temperature in conjunction with the concurrent presence of oxygen in the exhaust system of the gasoline engine. Since modern gasoline engines are normally operated without an oxygen excess at a stoichiometric air-fuel ratio ($\lambda=1$), additional measures are necessary for this purpose. Possible measures in this context include, for instance, raising the temperature by shifting the ignition angle, temporarily shifting towards a lean mixture in the gasoline engine, blowing secondary air into the exhaust system or a combination of these measures. So far, preference has been given to a shift of the ignition angle in the late direction in combination with a shift towards a lean mixture in the gasoline engine since this method makes do without the need for additional components and can deliver a sufficient amount of oxygen at most operating points of the gasoline engine. In the case of the currently known exhaust gas filter substrates for particulate filters, the exhaust gas of the internal combustion engine flows through a filter wall of the particulate filter.

The translation of European patent specification DE 603 17 056 T2 discloses a particulate filter having several parallel filter channels, whereby the filter channels are closed by plugs either on the inlet side or on the outlet side, whereby the plugs on the outlet side are made of a porous material in order to reduce the exhaust-gas counter-pressure of the particulate filter.

European patent application EP 1 251 247 A1 discloses a particulate filter for an internal combustion engine having several parallel filter channels, whereby the filter channels are closed by plugs either on the inlet side or on the outlet side, whereby the porosity of the filter walls between the filter channels is much higher than the porosity of the plugs.

Moreover, European patent application EP 1 312 776 A2 discloses a diesel particulate filter, whereby it is configured with filter channels that are closed by plugs either on the inlet side or on the outlet side. In order to prevent soot from burning off in an uncontrolled manner during regeneration, some of the filter channels are closed by plugs on the inlet side as well as on the outlet side, so that the exhaust gas cannot flow through these filter channels. This creates dead channels that separate the soot-laden filter channels from each other and that, during regeneration, prevent an uncontrolled flashover from a soot burn-off zone to other soot-laden filter channels.

SUMMARY OF THE INVENTION

Before this backdrop, the invention is based on the objective of improving the filtering efficiency of a brand-new particulate filter and of overcoming the drawbacks known from the state of the art, especially an inadequate particle separation in a brand-new particulate filter.

This objective is achieved according to the invention by means of a particulate filter for exhaust-gas aftertreatment in an internal combustion engine, whereby the particulate filter has a housing in which a filter element is arranged, whereby several first filter channels are configured in the filter element, each of which is closed on the outlet side by an impermeable closure or by a porous closure. Moreover, several second filter channels are configured in the filter element, each of which is closed on the inlet side by an impermeable closure. In this context, the first filter channels and the second filter channels are each separated from each other by a permeable filter wall, whereby, during operation, exhaust gas from the internal combustion engine enters the first filter channels of the particulate filter, flows through the filter walls and exits through the second filter channels. According to the invention, it is provided here that at least some of the second filter channels are closed on the outlet side by a high-porosity closure. In this context, the term high-porosity closure means a closure which exhibits a filtering effect with respect to the exhaust gas from the internal combustion engine but which only causes a slight rise in the exhaust-gas counter-pressure in the particulate filter and, for the rest, allows the exhaust gas of the internal combustion engine to pass through. Here, the improved filtering effect is achieved by the fact that the exhaust gas passes through the porous material several times. During operation, the soot particles are then deposited on the filter walls as well as on the high-porosity closures, causing the pore size to be reduced as the operation continues, thus enhancing the filtering effect.

The features put forward in the dependent claims permit further refinements of the particulate filter indicated in the independent claim.

In a preferred configuration of the particulate filter, it is provided that several second filter channels are closed on the outlet side by a high-porosity closure.

In this context, it is especially preferred if all of the second filter channels are each closed on the outlet side by a high-porosity closure.

According to a preferred embodiment of the particulate filter, it is provided for the filter channels to be configured in the form of honeycombs or tubes. A honeycomb structure translates into a particularly compact and space-saving arrangement of the filter channels in the filter element of the particulate filter. In this process, interstices and/or cavities between the individual filter channels are avoided, as a result of which the exhaust gas can easily pass from a first filter channel into a second filter channel.

As an alternative to a honeycomb-like structure, the filter channels can also be configured in the form of tubes, a measure which likewise allows a compact and space-optimized arrangement of the filter channels.

In an advantageous refinement of the invention, it is provided for the particulate filter to be coated with a catalytically active coating. A catalytically active coating might dispense with the need for an additional three-way catalytic converter, thus reducing the assembly work and the costs for the exhaust-gas aftertreatment system.

In this context, it is especially preferred if the catalytically active coating is configured as a three-way catalytically active coating. A particulate filter coated in this manner is also referred to as a four-way catalytic converter. A four-way catalytic converter can replace a three-way catalytic converter and a particulate filter in the exhaust gas system of the internal combustion engine, so that one component of the exhaust-gas aftertreatment system can be dispensed with. Preference is given to installing a four-way catalytic converter, especially as the first component of the exhaust-gas aftertreatment system, close to the engine in order to make it easier to heat up the four-way catalytic converter to the regeneration temperature in order to oxidize the soot that has been captured therein.

As an alternative, it is advantageously provided that the catalytically active coating is configured as a coating for the selective catalytic reduction of nitrogen oxides ($NO_x$). Especially in the case of diesel particulate filters, it can be advantageous if the particulate filter is provided with a coating for the selective catalytic reduction of nitrogen oxides (SCR coating). This not only accounts for the effect of minimizing the emission of particles but also contributes to reducing the $NO_x$ emissions.

In a preferred embodiment of the invention, it is provided that the high-porosity closures have a porosity of at least 40%, preferably at least 50%, especially preferably at least 60%. The porosity defines the percentage of free volume in the total volume of the porous element and it can be determined, for instance, volumetrically. Thanks to this degree of porosity, the rise in the exhaust-gas counterpressure can be kept relatively small in order to prevent negative secondary effects such as rough running of the engine, increased fuel consumption or misfiring. At the same time, such porosity allows an additional separation of the particles, thus altogether enhancing the filtering effect of the particulate filter.

In a preferred embodiment of the invention, it is provided for the high-porosity closures to be made of a ceramic material, especially cordierite. Such a closure is produced, for example, using a pasty compound that contains cordierite and that is inserted into the channels and subsequently hardened by means of drying processes and then set. The porosity in this material is attained, for instance, by using technical process steps such as influencing the degree of grinding of the raw materials as well as by using hydrocarbon-based additives that evaporate when the ceramic is burned in the oven, thereby creating the pore structure.

In a preferred embodiment of the particulate filter, it is provided for the first filter channels to be closed on the outlet side by low-porosity closures while the second filter channels are closed on the outlet side by high-porosity closures, whereby the ratio of the permeabilities between the low-porosity closures and the high-porosity closures amounts to at least one to two, preferably at least one to three, especially preferably at least one to five. Starting from such a ratio, it is ensured that most of the exhaust gas stream passes through the filter wall between the first and second filter channels, thus achieving the filtering effect of the particulate filter. Since the closure on the outlet side of first filter channels is a low-porosity closure, the filtering capacity can be enhanced since a greater porous filtering volume is then available and the exhaust gas passes through it.

In a preferred embodiment of the particulate filter, it is provided for the low-porosity closures to be made of a ceramic material, especially cordierite. The porosity in this material is attained, for instance, using technical process steps such as influencing the degree of grinding of the raw materials as well as using hydrocarbon-based additives that evaporate when the ceramic is burned in the oven, thereby creating the pore structure.

According to the invention, a method for the production of a particulate filter for an internal combustion engine is being put forward, whereby the particulate filter has a housing in which a filter element is arranged, whereby several first filter channels are configured on the filter element, each of which is closed on the outlet side by an impermeable closure or by a porous closure. Moreover, the filter element has several second filter channels, each of which is closed on the inlet side by an impermeable closure. In this context, the first filter channels and the second filter channels are separated from each other by a gas-permeable filter wall. According to the invention, it is provided that at least some of the second filter channels, preferably several second filter channels, especially preferably all of the second filter channels, are closed on the outlet side by a high-porosity closure. Such a method allows particulate filters to be produced which, especially when they are brand new, exhibit an improved filtering behavior with respect to soot particles. During operation of the particulate filter, a thin soot or ash layer is formed on the filter walls and this layer at least partially constricts or clogs the pores of the filter walls, thus increasing the filtering capacity of the particulate filter. Since such a soot or ash layer is not yet present when the filter is brand new, a particulate filter in its brand-new state displays a lower filtering capacity than after a few hours of operation of the internal combustion engine, when the first particles have been deposited on the soot filter. Owing to the production method according to the invention, the filtering capacity is increased, particularly in the first hours of operation of the particulate filter, thus enhancing the cleaning capacity regarding the soot particles.

In a preferred embodiment of the method, it is provided that the high-porosity closures are pressed and/or glued into the filter element. In this manner, from a manufacturing standpoint, it is technically simple and cost-effective to create a closure on the outlet side of the second filter channels. In this context, the process of installing the closures, especially the plugs that close the filter channels, can be largely automated and consequently, can be cost-effectively integrated into the serial production of the particulate filters.

As an alternative, it is advantageously provided for the high-porosity closures to be integrally bonded to the filter element or to be configured on the filter element.

According to the invention, it is suggested that a proposed particulate filter be employed in an exhaust gas system of a gasoline engine. The above-mentioned technical problem is encountered especially in direct injection gasoline engines since they produce considerably less soot then direct injection diesel engines do. In this context, the soot is created especially immediately after a cold start of the internal combustion engine, at a time when the combustion chamber walls are still cold and evaporation of the injected fuel is more difficult. Since a gasoline engine produces less particulate matter than a diesel engine during normal operation, the above-mentioned problem of the reduced filtering effect on the part of the particulate filter in its brand-new state occurs especially in gasoline engines. For this reason, the second filter channels should be closed with a high-porosity closure, especially in the case of gasoline engine particulate filters.

Unless otherwise indicated in a specific case, the various embodiments of the invention cited in this application can be advantageously combined with each other.

BRIEF DESCRIPTION OF THE DRAWINGS

The invention will be explained below on the basis of embodiments with reference to the accompanying drawings. In this context, identical components or components having the same function are provided with the same reference numerals. The following is shown.

DETAILED DESCRIPTION OF THE INVENTION

Figure 1:
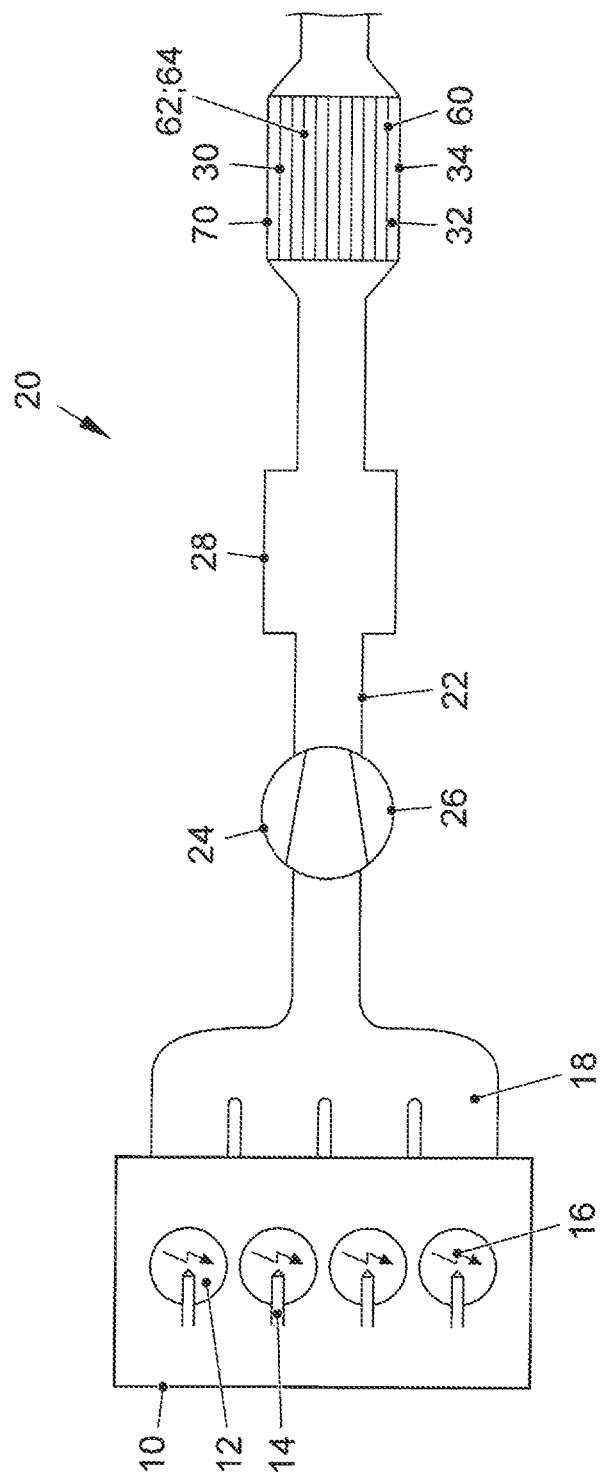
FIG. 1 is an internal combustion engine having an exhaust gas system in which a particulate filter according to the invention has been installed.

FIG. 1 shows an externally ignited internal combustion engine 10 for a motor vehicle. The internal combustion engine 10 is preferably configured as a gasoline engine that is externally ignited by means of spark plugs 16. The internal combustion engine 10 has at least one combustion chamber 12, preferably several combustion chambers 12 as shown in FIG. 1, into which fuel can be injected by means of a fuel injector 14. The exhaust 18 of the internal combustion engine 10 is connected to an exhaust gas system 20. The exhaust gas system 20 comprises an exhaust gas channel 22 in which a turbine 26 of an exhaust gas turbocharger 24 is arranged in the direction in which exhaust gas flows through the exhaust gas channel 22 downstream from the exhaust 18.

Downstream from the turbine 26, there is a three-way catalytic converter 28 in the exhaust gas channel 22, and further downstream, there is a particulate filter 30, especially a gasoline engine particulate filter 70.

As an alternative, the particulate filter 30 can also be arranged as the first component of the exhaust-gas aftertreatment system downstream from the turbine 26 and in this embodiment, it is preferably configured with a catalytically active coating 62, especially with a three-way catalytically active coating 64, as a so-called four-way catalytic converter 32. In the case of a diesel engine, the catalytically active coating 62 of the particulate filter 30 is preferably configured as a coating 66 for the selective catalytic reduction of nitrogen oxides (SCR coating).

Figure 2:
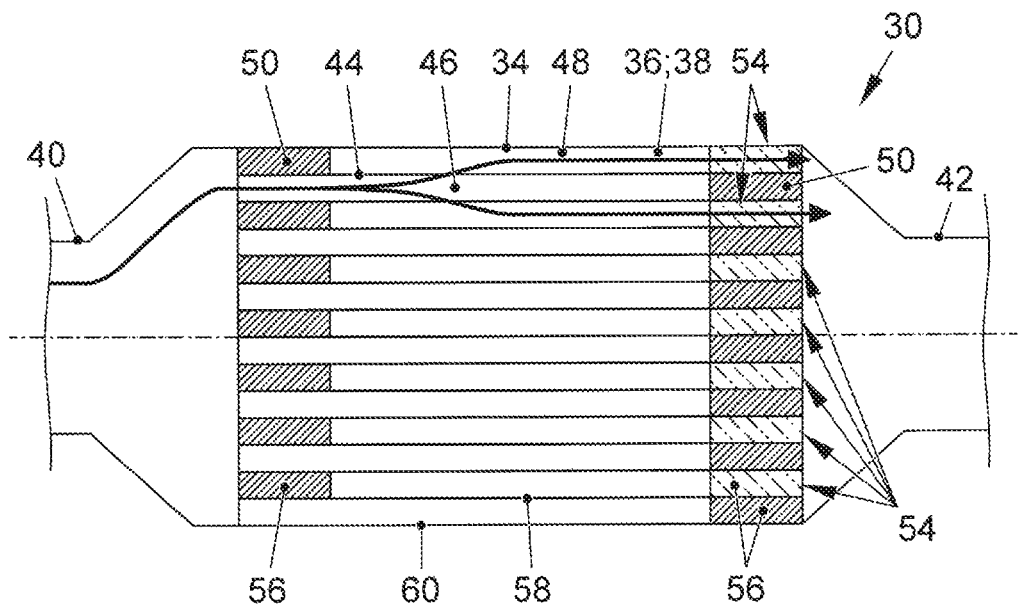
FIG. 2 is an embodiment of a particulate filter according to the invention, in a simplified sectional view.

A particulate filter 30 according to the invention for such an exhaust gas system 20 is shown in FIG. 2. The particulate filter 30 has a housing 34 which, as seen in the flow direction of the exhaust gas, has an inlet 40 on the front end, and an outlet 42 on the opposite end. A filter element 60 in which several essentially parallel filter channels 46, 48 are formed is arranged in the housing 34 of the particulate filter 30. The filter channels 46, 48 can be divided into first filter channels 46 and second filter channels 48. The first filter channels 46 are closed on the outlet side by a gas-impermeable closure 50, whereas the second filter channels 48 are closed by a gas-impermeable closure 50, especially a plug 56, on the inlet side, and by a high-porosity closure 54 on the outlet side. The first filter channels 46 and the second filter channels 48 are each configured like a honeycomb, whereby in each case, a first filter channel 46 and a second filter channel 48 are arranged next to each other and they separated from each other by a gas-permeable filter wall 44. As an alternative to a honeycomb-like configuration of the filter channels 46, 48, tubular filter channels 46, 48 are provided which likewise allow the filter element 60 to have a compact design.

During operation of the particulate filter 30, the exhaust gas of the internal combustion engine 10 flows through the exhaust gas channel 22 and through the inlet 40 into the particulate filter 30. In this process, the exhaust gas flows through the first filter channels 46 into the filter element 60, exits from there through the filter wall 44 and flows through the second filter channel 48 towards the outlet 42 of the particulate filter 30. In this process, soot particles are deposited on the filter wall 44. Due to the deposition of the particles and due to the ash formed from the soot particles during the regeneration of the particulate filter 30, a deposit layer 58 is formed on the filter walls 44 and this layer enhances the filtering effect of the particulate filter 30.

Figure 3:
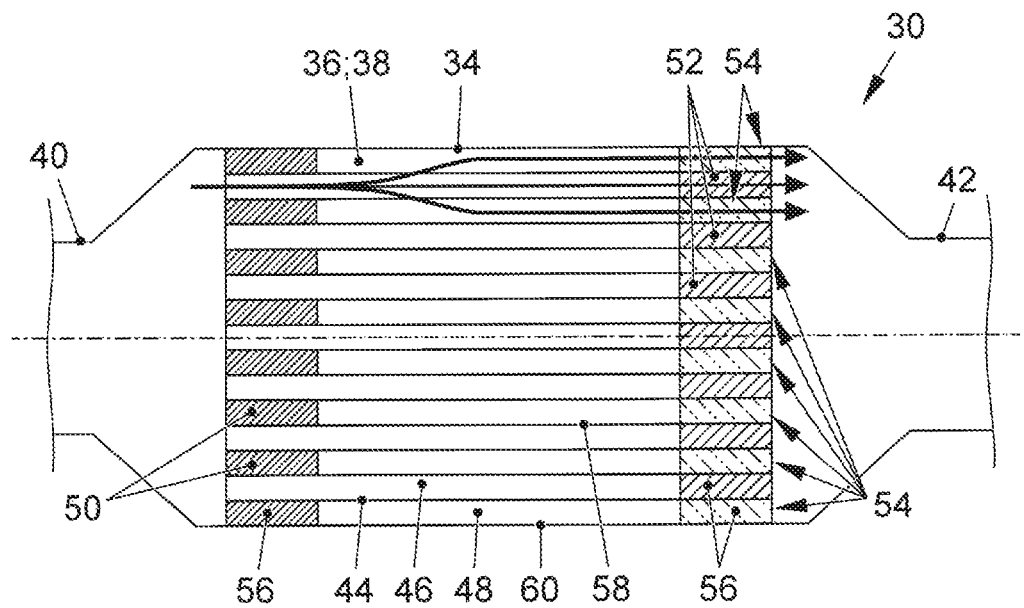
FIG. 3 is another embodiment of a particulate filter according to the invention, in a schematic sectional view.

FIG. 3 shows another embodiment of a particulate filter 30 according to the invention. The particulate filter 30 has a housing 34 which, as seen in the flow direction of the exhaust gas, has an inlet 40 at the front end, and an outlet 42 on the opposite end. A filter element 60 in which several essentially parallel filter channels 46, 48 are formed is arranged in the housing 34 of the particulate filter 30. The filter channels 46, 48 can be divided into first filter channels 46 and second filter channels 48. The first filter channels 46 are closed on the outlet side by a low-porosity closure 50, especially a plug 56, whereas the second filter channels 48 are closed by a gas-impermeable closure 50, especially a plug 56, on the inlet side and by a high-porosity closure 54 on the outlet side. The first filter channels 46 and the second filter channels 48 are each configured in the form of honeycombs or tubes, whereby in each case, a first filter channel 46 and a second filter channel 48 are arranged next to each other, and they are separated from each other by a gas-permeable filter wall 44. Owing to the low-porosity closure of the first filter channels, a small percentage of the exhaust gas stream can flow through the filter element 60 without flowing through a filter wall 44. This can at least partially compensate for the exhaust-gas counter-pressure of the particulate filter 30 and for the familiar disadvantages associated with this, especially elevated fuel consumption and/or rough running of the internal combustion engine 10. In this embodiment as well, the main exhaust gas stream leaves the first group of filter channels 46 through the filter wall 44 and enters the second filter channels 48. In this context, it is provided that the porosity of the high-porosity outlet-side closures 54 of the second filter channels 48 is configured to be at least five times higher than the porosity of the low-porosity closures 52 of the first filter channels 46. This ensures that the flow resistance of the first filter channels 46 through the filter wall 44 and through the high-porosity closures 54 on the outlet side is less than the flow resistance through the first filter channels 46 and the low-porosity closures 52 on the outlet side, so that the main exhaust gas stream, preferably at least 80% of the exhaust gas volume, especially preferably at least 90% of the exhaust gas volume, can flow through the filter walls 44 of the particulate filter 30, and the soot particles contained in the exhaust gas of the internal combustion engine 10 can be deposited on these filter walls 44. By means of a particulate filter 30 according to the invention, the number of particles of as well as the particle concentration of a direct injection gasoline engine can be significantly reduced, thus diminishing the environmental impact.

LIST OF REFERENCE NUMERALS 10 internal combustion engine
12 combustion chamber
14 fuel injector
16 spark plug
18 exhaust
20 exhaust gas system
22 exhaust gas channel
24 exhaust gas turbocharger
26 turbine
28 three-way catalytic converter
30 particulate filter
32 four-way catalytic converter
34 housing
36 honeycombs
38 tubes
40 inlet
42 outlet
44 filter wall
46 first filter channel
48 second filter channel
50 impermeable closure
52 low-porosity closure
54 high-porosity closure
56 plug
58 deposited layer
60 filter element
62 catalytically active coating
64 three-way catalytically active coating
66 coating for the selective catalytic reduction of nitrogen oxides
68 diesel particulate filter
70 gasoline particulate filter
$P_K$ particle concentration
$P_N$ number of particles

The invention claimed is:

1. A method for the production of a particulate filter for an internal combustion engine, comprising:
arranging a filter element in a housing of the particulate filter,
configuring several first filter channels in the filter element, wherein each of which is closed on an outlet side by a low-porosity closure,
configuring several second filter channels in the filter element, wherein each is closed on an inlet side by an impermeable closure, and
separating the first filter channels and the second filter channels from each other by a filter wall, whereby at least some of the second filter channels are closed on the outlet side by high-porosity closures, and
whereby the ratio of the permeabilities between the low-porosity closures and the high-porosity closures amounts to at least one to five.

2. The method for the production of a particulate filter according to claim 1, wherein the high-porosity closures are pressed and/or glued into the filter element.

3. The method for the production of a particulate filter according to claim 1, wherein the high-porosity closures are integrally bonded to the filter element or are configured on the filter element.

* * * * *